(12) United States Patent
Naoki

(10) Patent No.: US 9,692,063 B2
(45) Date of Patent: Jun. 27, 2017

(54) FUEL CELL SEPARATOR AND FUEL CELL

(75) Inventor: Takehiro Naoki, Sunto-gun (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 685 days.

(21) Appl. No.: 13/126,994

(22) PCT Filed: Jan. 22, 2009

(86) PCT No.: PCT/JP2009/051395
§ 371 (c)(1),
(2), (4) Date: Apr. 29, 2011

(87) PCT Pub. No.: WO2010/084624
PCT Pub. Date: Jul. 29, 2010

(65) Prior Publication Data
US 2011/0212385 A1  Sep. 1, 2011

(51) Int. Cl.
*H01M 8/0254* (2016.01)
*H01M 8/026* (2016.01)
*H01M 8/0267* (2016.01)

(52) U.S. Cl.
CPC ......... *H01M 8/0254* (2013.01); *H01M 8/026* (2013.01); *H01M 8/0267* (2013.01)

(58) Field of Classification Search
None
See application file for complete search history.

(56) References Cited

U.S. PATENT DOCUMENTS

| 5,300,370 | A | 4/1994 | Washington et al. |
| 6,207,312 | B1 | 3/2001 | Wynne et al. |
| 6,455,184 | B1 | 9/2002 | Peinecke |
| 6,974,648 | B2 | 12/2005 | Goebel |
| 2005/0058864 | A1* | 3/2005 | Goebel ........................... 429/26 |

FOREIGN PATENT DOCUMENTS

| DE | 19808331 A1 | 9/1999 |
| DE | 102004043513 A1 | 4/2005 |
| JP | 11-16591 A | 1/1999 |
| JP | 2003-178776 A | 6/2003 |
| JP | 2005-32577 A | 2/2005 |

(Continued)

OTHER PUBLICATIONS

JP, 2005-327670, A (a raw machine translation).*

(Continued)

*Primary Examiner* — Patrick Ryan
*Assistant Examiner* — Carmen Lyles-Irving
(74) *Attorney, Agent, or Firm* — Andrews Kurth Kenyon LLP

(57) ABSTRACT

A fuel cell separator comprises a first plate and a second plate. The first plate has a plurality of first projections protruded toward the second plate to define reactive gas flow paths, the second plate has a plurality of second projections protruded toward the first plate to define reactive gas flow paths. A top of each of the plurality of first projections is in contact with an intermediate part between adjacent two of the plurality of second projections formed on the second plate, and a top of each of the plurality of second projections is in contact with an intermediate part between adjacent two of the plurality of first projections formed on the first plate.

8 Claims, 6 Drawing Sheets

(56) References Cited

FOREIGN PATENT DOCUMENTS

| | | |
|---|---|---|
| JP | 2005-32578 A | 2/2005 |
| JP | 2005-327670 A | 11/2005 |
| JP | 2005322595 A | 11/2005 |
| JP | 2006-228580 A | 8/2006 |
| JP | 2006331916 a | 12/2006 |
| JP | 2007-200700 A | 8/2007 |

OTHER PUBLICATIONS

JP, 2005-032578, A (a raw machine translation).*
International Search Report issued Mar. 24, 2009 in PCT/JP2009/051395.
T.V. Nguyen, "A Gas Distributor Design for Proton-Exchange-Membrane Fuel Cells", J. Electrochem. Soc., vol. 143, No. 5, May 1996, pp. L103-L105.
International Search Report mailed Mar. 24, 2009 in International Application No. PCT/JP2009/051395.

* cited by examiner

FUEL CELL SEPARATOR AND FUEL CELL

This is a 371 national phase application of PCT/JP2009/051395 filed Jan. 22, 2009, the content of which is incorporated herein by reference.

FIELD OF THE INVENTION

The present invention relates to a fuel cell and more specifically to a fuel cell separator.

BACKGROUND OF THE INVENTION

A known structure of a fuel cell separator has recesses and convexes formed on respective faces to define a reactive gas flow path on one face and to define a cooling water flow path on the other face. The shapes of the recesses and the convexes affect the power generation efficiency of the fuel cell. There have been no sufficient discussions or studies on the shapes of the recesses and the convexes formed on each separator by taking into account the power generation efficiency of the fuel cell.

SUMMARY OF THE INVENTION

By taking into account at least part of the issue discussed above, there is a requirement for providing a separator that enables improvement of the power generation efficiency of a fuel cell.

In order to address at least part of the requirement described above, the present invention provides various embodiments and applications described below.

A first aspect of the present invention is directed to a fuel cell separator, the separator comprises a first plate and a second plate, wherein the first plate has a plurality of first projections protruded toward the second plate to define reactive gas flow paths, the second plate has a plurality of second projections protruded toward the first plate to define reactive gas flow paths, a top of each of the plurality of the first projections is in contact with an intermediate part between adjacent two of the plurality of the second projections formed on the second plate, and a top of each of the plurality of the second projections is in contact with an intermediate part between adjacent two of the plurality of the first projections formed on the first plate.

The separator according to this aspect of the invention raises the pitch of the first projections and the pitch of the second projections without expanding the overall thickness of the fuel cell in its stacking direction. The flow of the reactive gas readily removes the water produced by the electrochemical reaction of the fuel cell and located in the intermediate part between the two adjacent projections. This lowers the potential for flooding and improves the power generation efficiency of the fuel cell. Raising the pitches of the projections effectively increase the ratio of the area with the high power generation efficiency of the fuel cell and thereby improves the overall power generation efficiency of the fuel cell.

A second aspect of the present invention is directed to the fuel cell separator in accordance with aspect 1, wherein one side face of each of the plurality of first projections is in contact with one side face of corresponding one of the plurality of the second projections.

The structure of this application expands the contact area between the first plate and the second plate, thus reducing the contact resistance between the first plate and the second plate. This arrangement accordingly reduces a contact resistance-induced voltage drop.

A third aspect of the present invention is directed to the fuel cell separator in accordance with either one of aspects 1 and 2, further comprises a third plate and a fourth plate arranged on an opposite side to the first plate and the second plate across a membrane electrode assembly, wherein the third plate has a plurality of third projections protruded toward the fourth plate to define reactive gas flow paths, the fourth plate has a plurality of fourth projections protruded toward the third plate to define reactive gas flow paths, the plurality of the third projections and the plurality of the second projections are arranged to face each other across the membrane electrode assembly, and the plurality of the fourth projections and the plurality of the first projections are arranged to face each other across the membrane electrode assembly.

The structure of this embodiment has the third projections arranged to face the second projections and the fourth projections arranged to face the first projections, thus enhancing the strength of the separator.

A forth aspect of the present invention is directed to the fuel cell separator in accordance with any one of aspects 1 through 3, further comprises a first manifold for reactive gas supply; and a second manifold for reactive gas exhaust, wherein each of the projections is of strip shaped, the reactive gas flow paths defined by the projections are alternately connected with the first manifold and the second manifold, and the reactive gas flow paths defined by the projections have closed ends that are opposite to respective connection ends alternately connecting with the first manifold and the second manifold.

The structure of this embodiment enables the efficient supply of the reactive gases over the membrane electrode assemblies.

A fifth aspect of the present invention is directed to a fuel cell, the fuel cell comprises the fuel cell separator in accordance with any one of aspects 1 through 4; and a membrane electrode assembly.

The technique of the present invention is not restricted to the fuel cell separator having any of the configurations and arrangements discussed above but may be actualized by diversity of other applications, for example, a fuel cell including the fuel cell separator. The invention is not limited to any of the embodiments and applications discussed above but may be actualized in diversity of other embodiments and applications within the scope of the invention.

DETAILED DESCRIPTION

Figure 1:
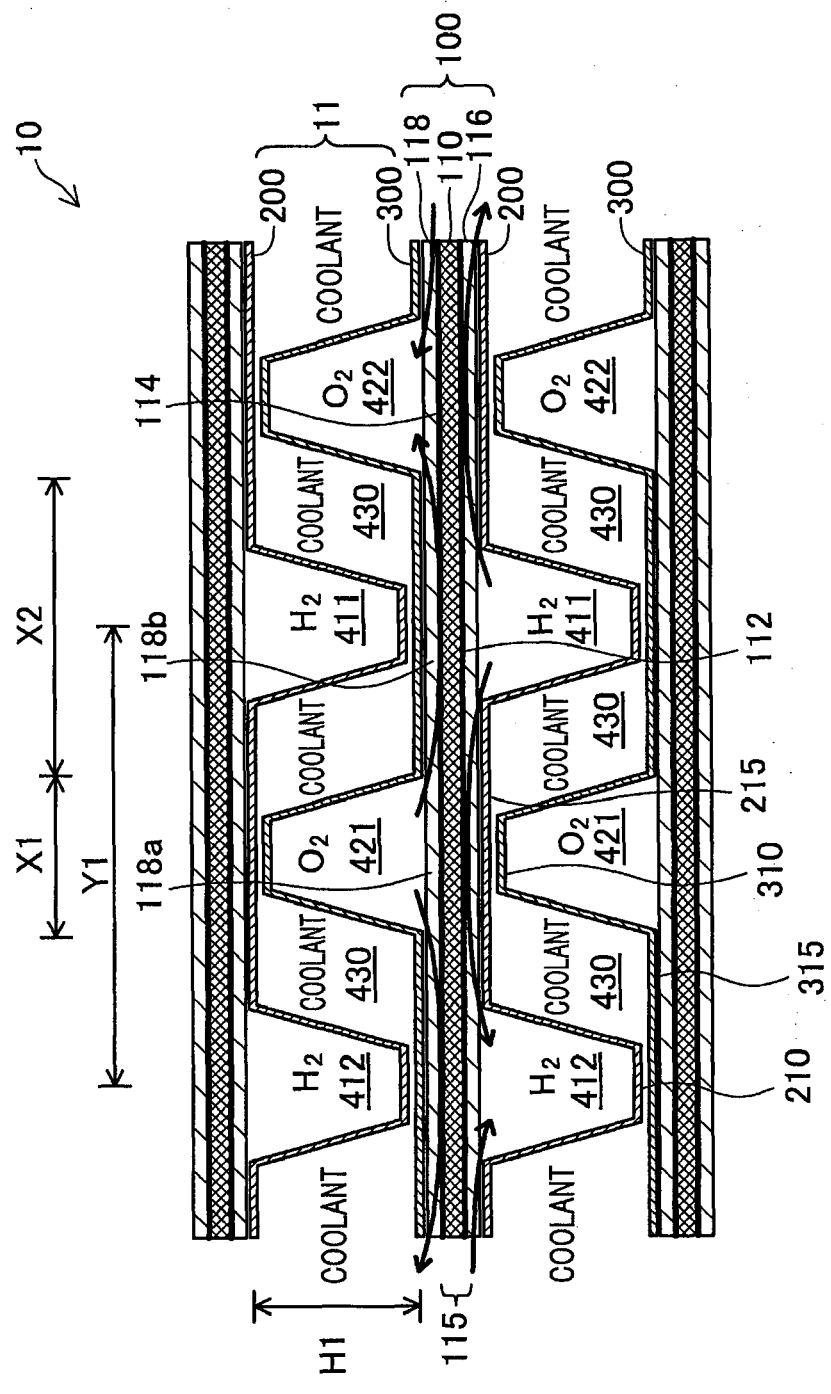
FIG. 1 is an explanatory diagrammatic representation of the cross section of part of a fuel cell in a first embodiment of the invention.

FIG. 1 is an explanatory diagrammatic representation of the cross section of part of a fuel cell in a first embodiment of the invention. The fuel cell 10 includes separators 11 and membrane electrode/gas diffusion layer assemblies 100. The separator 11 includes an anode-side separator plate 200 (hereafter referred to as "anode-side plate 200") and a cathode-side separator plate 300 (hereafter referred to as "cathode-side plate 300"). For the purpose of the improved visualization, there are some clearances between the membrane electrode/gas diffusion layer assembly 100, the anode-side plate 200, and the cathode-side plate 300 in the illustration of FIG. 1. In the actual state, however, there are no such clearances but these components are in contact with each other.

The membrane electrode/gas diffusion layer assembly 100 includes an electrolyte membrane 110, catalyst layers 112 and 114, and gas diffusion layers 116 and 118. The electrolyte membrane 110 moves the protons produced on the anode side toward the cathode side. The electrolyte membrane 110 is, for example, a proton-conductive ion exchange membrane made of, for example, a fluororesin such as perfluorocarbon sulfonic acid polymer or a hydrocarbon resin.

The catalyst layers 112 and 114 are formed on the respective faces of the electrolyte membrane 110. For example, a platinum catalyst or a platinum alloy catalyst consisting of platinum and another metal may be used for the catalyst of the catalyst layers 112 and 114. The catalyst is supported on a carrier, for example, carbon particles and is applied on the respective faces of the electrolyte membrane 110 to form the catalyst layers 112 and 114. The assembly of the electrolyte membrane 110 and the catalyst layers 112 and 114 is called "membrane electrode assembly 115".

The gas diffusion layers 116 and 118 are located respectively outside the catalyst layers 112 and 114. Carbon non-woven fabric or carbon paper may be used for the gas diffusion layers 116 and 118. Alternatively a porous metal or a porous resin may be used for the gas diffusion layers 116 and 118.

Figure 2:
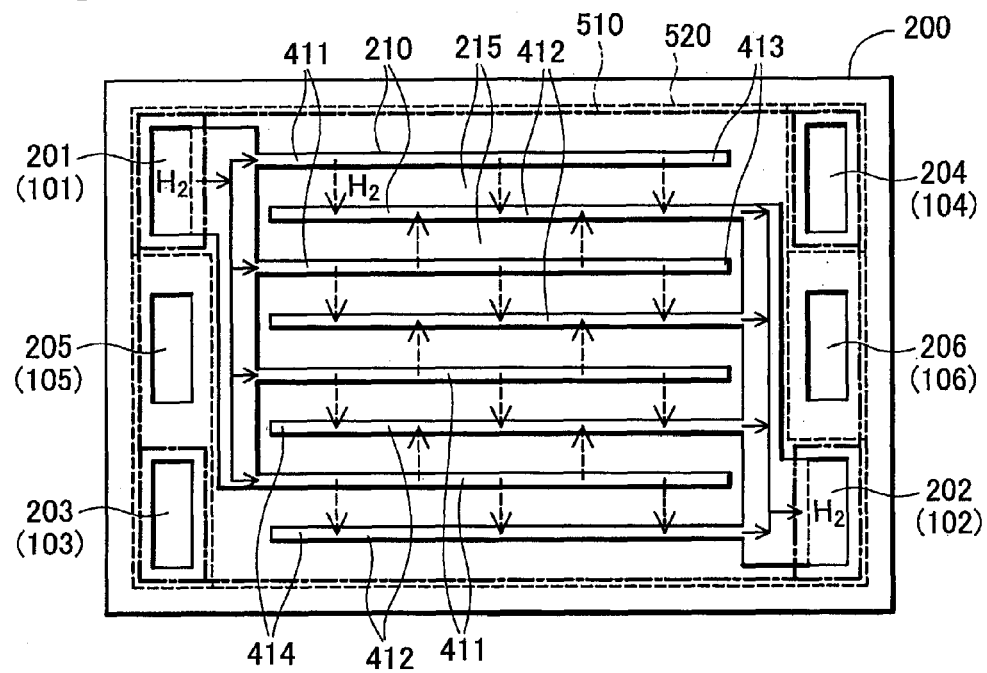
FIG. 2 is a plan view of an anode-side plate.

FIG. 2 is a plan view of the anode-side plate 200 seen from the cathode-side plate 300 shown in FIG. 1. The anode-side plate 200 is, for example, a metal member in a substantially rectangular shape and has openings 201 through 206 formed in an outer circumferential area. These openings 201 through 206 form manifolds 101 through 106 provided for supply and discharge of reactive gases and a coolant.

The anode-side plate 200 has a plurality of projections 210 provided in a center area. Each of the projections 210 is of strip shaped to be protruded forward in FIG. 2 (i.e., toward the cathode-side plate 300 shown in FIG. 1). The respective projections 210 are arranged to be substantially in parallel with one another. Fuel gas flow paths 411 and 412 (FIG. 1) are defined on one side of the projections 210 facing the membrane electrode/gas diffusion layer assembly 100. As shown in FIG. 2, each of the fuel gas flow paths 411 has one end communicating with the manifold 101 and the other end 413 closed. The manifold 101 serves as a fuel gas supply manifold, and the fuel gas flow paths 411 serve as a passage for fuel gas supply. Each of the fuel gas flow paths 412 has one end communicating with the manifold 102 and the other end 414 closed. The manifold 102 serves as a fuel gas exhaust manifold, and the fuel gas flow paths 412 serve as a passage for fuel gas exhaust. The fuel gas flow paths 411 and 412 are alternately provided in an engaged comb-like arrangement. Recessed portions from the projections 210 toward the membrane electrode/gas diffusion layer assembly 100 are called recesses 215.

Figure 3:
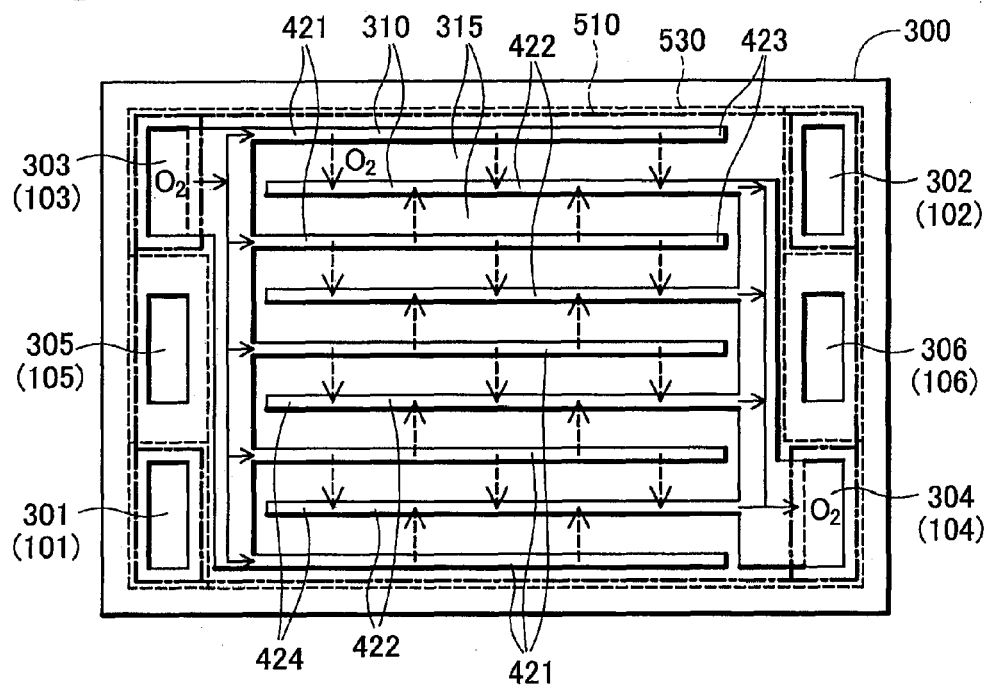
FIG. 3 is a plan view of a cathode-side plate.

FIG. 3 is a plan view of the cathode-side plate 300 seen from the anode-side plate 200 shown in FIG. 1. The cathode-side plate 300 is, for example, a metal member in a substantially rectangular shape and has openings 301 through 306 formed in an outer circumferential area. These openings 301 through 306 form the manifolds 101 through 106 provided for the supply and discharge of the reactive gases and the coolant.

The cathode-side plate 300 has a plurality of projections 310 provided in a center area. Each of the projections 310 is of strip shaped to be protruded forward in FIG. 3 (i.e., toward the anode-side plate 200 shown in FIG. 1). The respective projections 310 are arranged to be substantially in parallel with one another. Oxidizing gas flow paths 421 and 422 (FIG. 1) are defined on one side of the projections 310 facing the membrane electrode/gas diffusion layer assembly 100. As shown in FIG. 3, each of the oxidizing gas flow paths 421 has one end communicating with the manifold 103 and the other end 423 closed. The manifold 103 serves as an oxidizing gas supply manifold, and the oxidizing gas flow paths 421 serve as a passage for oxidizing gas supply. Each of the oxidizing gas flow paths 422 has one end communicating with the manifold 104 and the other end 424 closed. The manifold 104 serves as an oxidizing gas exhaust manifold, and the oxidizing gas flow paths 422 serve as a passage for oxidizing gas exhaust. The oxidizing gas flow paths 421 and 422 are alternately provided in an engaged comb-like arrangement. Recessed portions from the projections 310 toward the membrane electrode/gas diffusion layer assembly 100 are called recesses 315.

As shown in FIG. 1, the projections 210 of the anode-side plate 200 are in contact with the recesses 315 of the cathode-side plate 300, and the projections 310 of the cathode-side plate 300 are in contact with the recesses 215 of the anode-side plate 200. Coolant flow paths 430 are defined between the recesses 215 and the recesses 315.

As shown in FIG. 2, a gasket 510 is provided on the anode-side plate 200 such as to face the cathode-side plate 300. For convenience of illustration, only the positions of sealing ribs of the gasket 510 are shown by the one-dot chain line. The gasket 510 has sealing ribs formed to surround over the openings 201 through 206 and the whole area of the projections 210. These sealing ribs of the gasket 510 serve to prevent leakage of a coolant in the planar direction of the anode-side plate 200. The gasket 510 also has sealing ribs formed to individually surround the respective openings 201 through 204. These sealing ribs of the gasket 510 serve to prevent leakage of a fuel gas or an oxidizing gas in the planar direction of the anode-side plate 200.

A gasket 520 (shown by the broken line) is provided on the anode-side plate 200 such as to face the membrane electrode/gas diffusion layer assembly 100. The gasket 520 has sealing ribs formed to surround over the openings 201 through 206 and the whole area of the projections 210. These sealing ribs of the gasket 520 serve to prevent leakage of the fuel gas in the planar direction of the anode-side plate 200. The gasket 520 also has sealing ribs formed to individually surround the respective openings 203 through 206. These sealing ribs of the gasket 520 serve to prevent leakage of the oxidizing gas or the coolant in the planar direction of the anode-side plate 200.

As shown in FIG. 3, a gasket 530 (the positions of its sealing ribs are shown by the broken line) is provided on the cathode-side plate 300 such as to face the membrane electrode/gas diffusion layer assembly 100. The gasket 530 has sealing ribs formed to surround over the openings 301 through 306 and the whole area of the projections 310. These sealing ribs of the gasket 530 serve to prevent leakage of the oxidizing gas in the planar direction of the cathode-side plate 300. The gasket 530 also has sealing ribs formed to individually surround the respective openings 301, 302, 305, and 306. These sealing ribs of the gasket 530 serve to prevent leakage of the fuel gas or the coolant in the planar direction of the cathode-side plate 300.

In the illustration of FIG. 3, the positions of the sealing ribs of the gasket 510 are shown by the one-dot chain line. This gasket 510 is identical with the gasket 510 of FIG. 2 provided on the anode-side plate 200 such as to face the cathode-side plate 300. This means that the gasket 510 is located between the anode-side plate 200 and the cathode-side plate 300.

Figure 4:
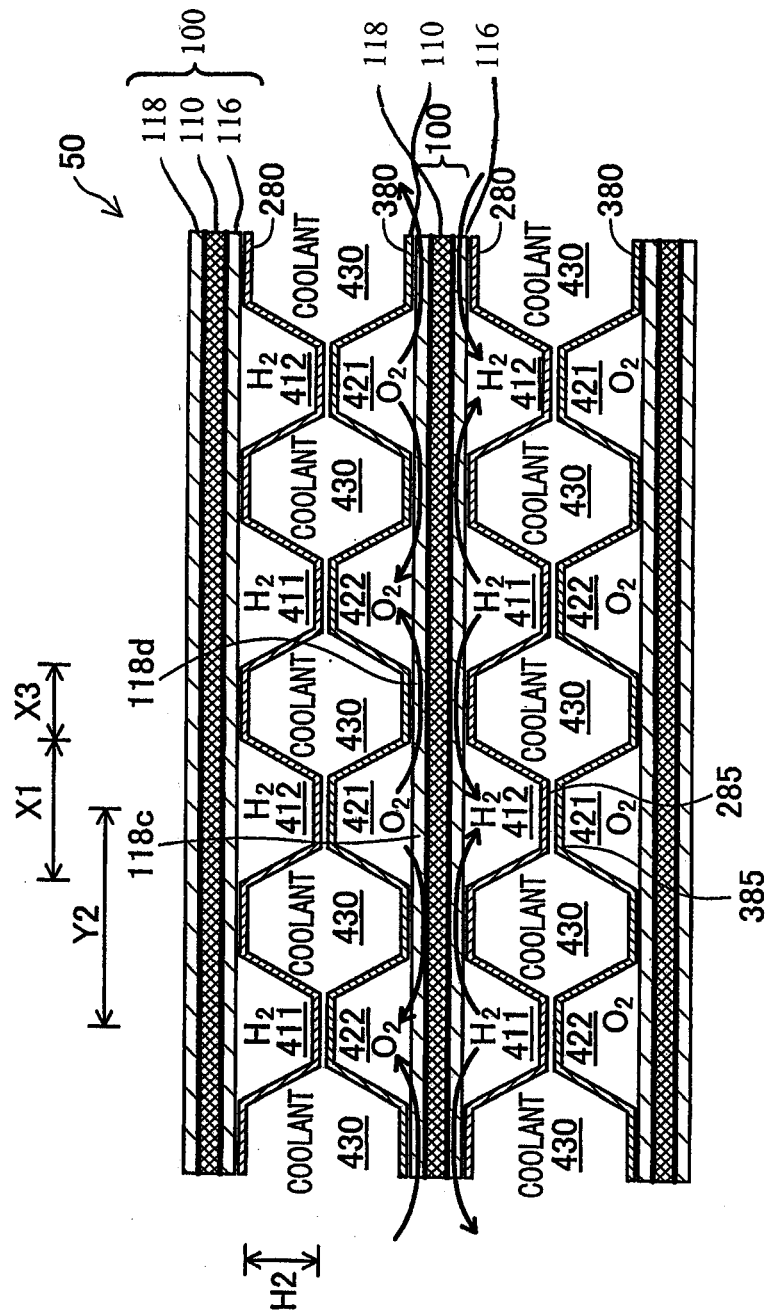
FIG. 4 is an explanatory diagrammatic representation of the cross section of part of a conventional fuel cell.

FIG. 4 is an explanatory diagrammatic representation of the cross section of part of a conventional fuel cell. The conventional fuel cell 50 (hereafter referred to as the "prior art") includes membrane electrode/gas diffusion layer assemblies 100, anode-side plates 280, and cathode-side plates 380. Each of the anode-side plates 280 has projections 285 that are protruded toward the adjacent cathode-side plate 380. Each of the cathode-side plates 380 has projections 385 that are protruded toward the adjacent anode-side plate 280.

The primary differences of the prior art from the first embodiment are the positions and the dimensions of the projections 285 and the projections 385. In the prior art, the projections 285 are arranged to face the projections 385, such that the tops of the projections 285 are in contact with the tops of the facing projections 385. The projections 285 and 385 of the prior art have a pitch Y2 and a height H2 (FIG. 4) that are different from a pitch Y1 and a height H1 of the projections 210 and 310 of the first embodiment (FIG. 1). More specifically, the pitch Y1 of the projections 210 and 310 of the first embodiment (FIG. 1) is double the pitch Y2 of the projections 285 and 385 of the prior art (FIG. 4). The height H1 of the projections 210 and 310 of the first embodiment (FIG. 1) is double the height H2 of the projections 285 and 385 of the prior art (FIG. 4).

In the first embodiment shown in FIG. 1, setting Y1 (=2*Y2) and H1 (=2*H2) to the pitch and to the height of the projections 210 and 310 gives the reactive gas flow paths of an identical sectional area with that of the prior art and enables the supply of the reactive gases at the same flow rates.

The flow of the oxidizing gas through the gas diffusion layer 118 is discussed below. Both non-contact areas 118*a* of the first embodiment and non-contact areas 118*c* of the prior art where the gas diffusion layer 118 is not in contact with the cathode-side plate 300 or 380 have an equal width X1 (FIGS. 1 and 4). Contact areas 118*b* of the first embodiment where the gas diffusion layer 118 is in contact with the cathode-side plate 300, however, have a width X2 (FIG. 1) that is different from a width X3 (FIG. 4) of contact areas 118*d* of the prior art where the gas diffusion layer. 118 is in contact with the cathode-side plate 380, where X2>X3.

In the non-contact areas 118*a* and 118*c* where the gas diffusion layer 118 is not in contact with the cathode-side plate 300 or 380, there is low probability of oxidizing gas migration. The little oxidizing gas migration hinders smooth removal of the water produced by the electrochemical reaction in the fuel cell and increases the potential for flooding. The flooding thus occurs in some time after the start of operation of the fuel cell to interfere with the sufficient supply of oxygen and lower the power generation efficiency of the fuel cell. In the contact areas 118*b* and 118*d* where the gas diffusion layer 118 is in contact with the cathode-side plate 300 or 380, on the other hand, the oxidizing gas introduced into the oxidizing gas flow paths 421 flows through the contact areas 118*b* or 118*d* of the gas diffusion layer 118 to the oxidizing gas flow paths 422. This flow of the oxidizing gas enables removal of the water accumulated in the contact areas 118*b* or 118*d*. The contact areas 118*b* and 118*d* hence have low potential for flooding and thereby the high power generation efficiency of the fuel cell.

The ratio of the width of the contact areas 118*b* to the width of the non-contact areas 118*a* in the first embodiment is set to be greater than the ratio of the width of the contact areas 118*d* to the width of the non-contact areas 118*c* in the prior art. This means that the first embodiment has the higher ratio of the contact areas 118*b* with the high power generation efficiency than the prior art. The first embodiment accordingly has the higher power generation efficiency of the fuel cell 10 than the prior art.

In the first embodiment, as shown in FIGS. 2 and 3, the fuel gas flow paths 411 and 412 are alternately arranged and have one closed ends. The fuel gas introduced into the fuel gas flow paths 411 accordingly flows through the gas diffusion layer 116 to the fuel gas flow paths 412. Similarly the oxidizing gas introduced into the oxidizing gas flow paths 421 flows through the gas diffusion layer 118 to the oxidizing gas flow paths 422. This arrangement assures passage of the fuel gas or the oxidizing gas through the gas diffusion layer 116 or the gas diffusion layer 118 (more specifically, the contact areas 118*b*), thus enabling the efficient supply of the fuel gas or the oxidizing gas to the membrane electrode assembly 115.

In the structure of the prior art, doubling the pitch of the projections 385 expands the width of the contact areas 118*d* to increase the power generation efficiency of the fuel cell 50 like the first embodiment. The structure of the prior art, however, requires doubling the height of the projections 385 to achieve the same supply of the oxidizing gas. Doubling the height undesirably expands the overall dimension of the fuel cell 50 in its stacking direction. The structure of the first embodiment, on the other hand, achieves the increase of the power generation efficiency of the fuel cell 10 without changing the dimension of the fuel cell 10 in its stacking direction.

Figure 5:
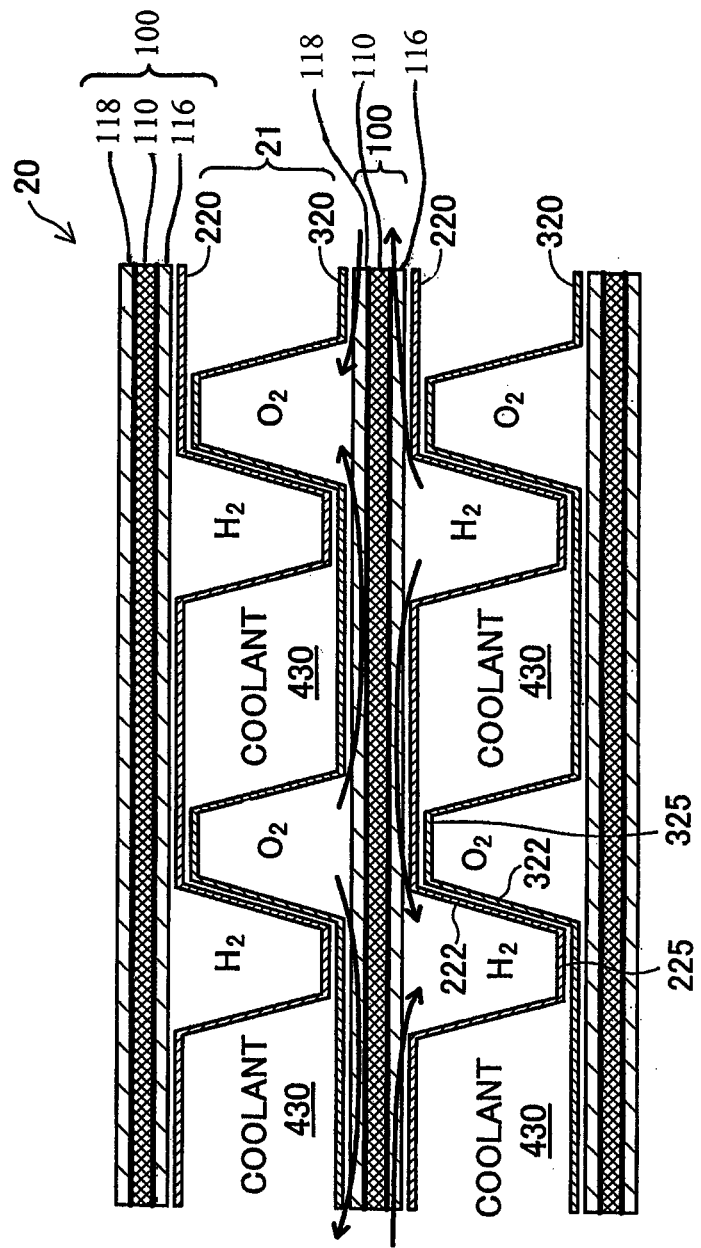
FIG. 5 is an explanatory diagrammatic representation of the cross section of part of a fuel cell in a second embodiment of the invention.

FIG. 5 is an explanatory diagrammatic representation of the cross section of part of a fuel cell in a second embodiment of the invention. The fuel cell 20 of the second embodiment includes separators 21 and membrane electrode/gas diffusion layer assemblies 100. The separator 21 includes an anode-side plate 220 and a cathode-side plate 320. The primary difference of the anode-side plate 220 and the cathode-side plate 320 of the second embodiment from the anode-side plate 200 and the cathode-side plate 300 of the first embodiment is the positions of projections 225 and 325. In the second embodiment, the positions of the projections 225 and 325 formed on the anode-side plate 220 and the cathode-side plate 320 are shifted in the alignment direction of the projections 225 and 325, such that a side face 222 of each of the projections 225 is in contact with a side face 322 of each corresponding projection 325. This arrangement lowers the contact resistance between the anode-side plate 220 and the cathode-side plate 320. The structure of the second embodiment reduces a loss (contact resistance-induced voltage drop) induced by the contact resistance between the anode-side plate 220 and the cathode-side plate 320 and thereby improves the power generation efficiency of the fuel cell 20 compared with the prior art. The structure of the second embodiment has the shorter circumferential length relative to the sectional area and thereby lowers the pressure loss in the coolant flow paths 430.

Figure 6:
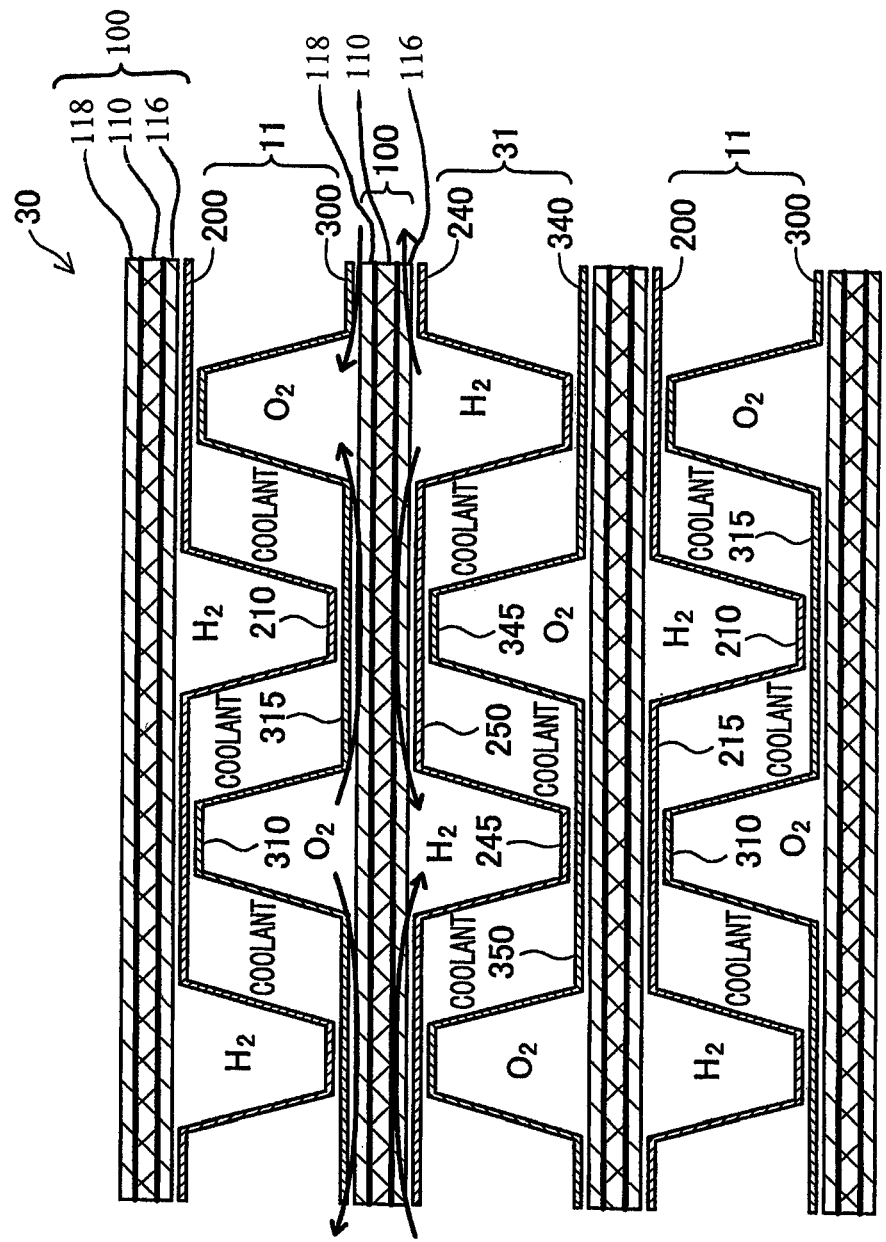
FIG. 6 is an explanatory diagrammatic representation of the cross section of part of a fuel cell in a third embodiment of the invention.

FIG. 6 is an explanatory diagrammatic representation of the cross section of part of a fuel cell in a third embodiment of the invention. The fuel cell 30 of the third embodiment includes separators 11 and 31 and membrane electrode/gas diffusion layer assemblies 100. The separator 11 includes an anode-side plate 200 and a cathode-side plate 300, and the separator 31 includes an anode-side plate 240 and a cathode-side plate 340. The structures of the membrane electrode/gas diffusion layer assemblies 100 and the separator 11 (i.e., the first anode-side plate 200 and the first cathode-side plate 300) are similar to those of the first embodiment.

The second anode-side plate 240 and the second cathode-side plate 340 are arranged to be respectively adjacent to the first cathode-side plate 300 and the first anode-side plate 200 across the membrane electrode/gas diffusion layer assemblies 100. The second anode-side plate 240 has projections 245 and recesses 250, and the second cathode-side plate 340 has projections 345 and recesses 350. The projections 245 and the recesses 250 formed on the second anode-side plate 240 respectively correspond to the projections 210 and the recesses 215 formed on the first anode-side plate 200. Similarly the projections 345 and the recesses 350 formed on the second cathode-side plate 340 respectively correspond to the projections 310 and the recesses 315 formed on the first cathode-side plate 300.

The first anode-side plate 200 and the second cathode-side plate 340 are arranged, such that the projections 210 and the projections 345 face each other across the membrane electrode/gas diffusion layer assembly 100 and that the recesses 215 and the recesses 350 face each other across the membrane electrode/gas diffusion layer assembly 100. The second anode-side plate 240 and the first cathode-side plate 300 are arranged, such that the projections 245 and the projections 310 face each other across the membrane electrode/gas diffusion layer assembly 100 and that the recesses 250 and the recesses 315 face each other across the membrane electrode/gas diffusion layer assembly 100. This arrangement gives the facing geometries between the respective tops of the corresponding projections 210 and 345, between the respective tops of the corresponding projections 245 and 310, between the respective bottoms of the corresponding recesses 215 and 350, and between the respective bottoms of the corresponding recesses 250 and 315 across the membrane electrode/gas diffusion layer assemblies 100. These geometries cancel out the folding forces applied to the anode-side plates 200 and 240 and the cathode-side plates 300 and 340, thus enhancing the strength of the fuel cell 30. This arrangement enables the thickness reduction of the anode-side plates 200 and 240 and the cathode-side plates 300 and 340 and the resulting overall weight reduction of the fuel cell.

In the structure of the third embodiment, the flow direction of the fuel gas is set to be opposite to the flow direction of the oxidizing gas. In the arrangement of setting the same flow direction to the fuel gas flow and to the oxidizing gas flow, the supply side of the fuel gas and the oxidizing gas (i.e., the upstream side) has the high reactivity of the fuel cell and thereby a large amount of produced water, while the downstream side has a relatively small amount of produced water. This causes imbalance of the amount of produced water. In the arrangement of setting the opposite flow directions to the fuel gas flow and to the oxidizing gas flow like the third embodiment discussed above, on the other hand, the reactivity of the fuel cell is substantially equalized over the entire flows of the reactivity gases including the upstream, the midstream, and the downstream. This achieves good balance of the amount of produced water and enables improvement of the power generation efficiency.

Figure 7:
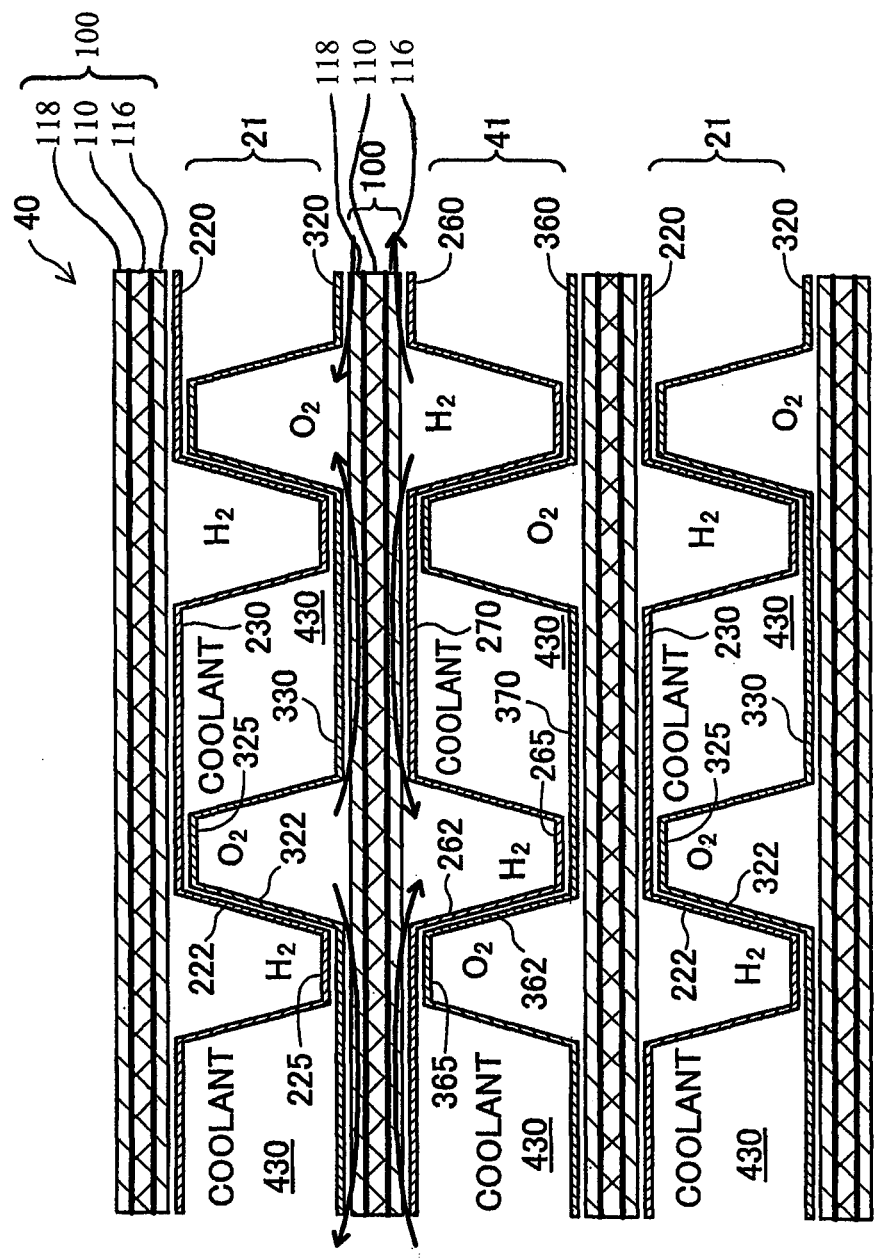
FIG. 7 is an explanatory diagrammatic representation of the cross section of part of a fuel cell in a fourth embodiment of the invention.

FIG. 7 is an explanatory diagrammatic representation of the cross section of part of a fuel cell in a fourth embodiment of the invention. The fuel cell 40 of the fourth embodiment includes separators 21 and 41 and membrane electrode/gas diffusion layer assemblies 100. The separator 21 includes an anode-side plate 220 and a cathode-side plate 320, and the separator 31 includes an anode-side plate 260 and a cathode-side plate 360. The structures of the membrane electrode/gas diffusion layer assemblies 100 and the separator 21 (i.e., the first anode-side plate 220 and the first cathode-side plate 320) are similar to those of the second embodiment.

The primary difference of the fourth embodiment from the third embodiment is the positions of projections 225, 265, 325, and 365. More specifically, like the difference of the second embodiment from the first embodiment, the positions of the projections 225, 265, 325, and 365 are shifted in the alignment direction of the projections 225, 265, 325, and 365, such that a side face 222 of each of the projections 225 is in contact with a side face 322 of each corresponding projection 325 and that a side face 262 of each of the projections 265 is in contact with a side face 362 of each corresponding projection 365. This arrangement lowers the contact resistance between the anode-side plate 220 and the cathode-side plate 320 and the contact resistance between the anode-side plate 260 and the cathode-side plate 360. The structure of the fourth embodiment reduces a loss (contact resistance-induced voltage drop) induced by such contact resistance and thereby improves the power generation efficiency of the fuel cell 40 compared with the prior art.

The first anode-side plate 220 and the second cathode-side plate 360 are arranged, such that the projections 215 and the projections 365 face each other across the membrane electrode/gas diffusion layer assembly 100 and that recesses 230 and recesses 370 face each other across the membrane electrode/gas diffusion layer assembly 100. The second anode-side plate 260 and the first cathode-side plate 320 are arranged, such that the projections 265 and the projections 325 face each other across the membrane electrode/gas diffusion layer assembly 100 and that recesses 270 and recesses 330 face each other across the membrane electrode/gas diffusion layer assembly 100. This arrangement gives the facing geometries between the respective tops of the corresponding projections 225 and 365, between the respective tops of the corresponding projections 265 and 325, between the respective bottoms of the corresponding recesses 230 and 370, and between the respective bottoms of the corresponding recesses 270 and 330 across the membrane electrode/gas diffusion layer assemblies 100. These geometries cancel out the folding forces applied to the anode-side plates 220 and 260 and the cathode-side plates 320 and 360, thus enhancing the strength of the fuel cell 40. The structure of the fourth embodiment accordingly achieves both the improvement of the power generation efficiency by the reduction of the contact resistance and the enhancement of the strength of the fuel cell 40. The structure of the fourth embodiment also sets the opposite flow directions to the fuel gas flow and to the oxidizing gas flow, thus achieving good balance of the amount of produced water by the electrochemical reaction and improving the power generation efficiency. The structure of the fourth embodiment further has the shorter circumferential length relative to the sectional area and thereby lowers the pressure loss in the coolant flow paths 430.

The embodiments and their modified examples are described for the better understanding of the invention and are to be considered in all aspects as illustrative and not restrictive. There may be many modifications, changes, and alterations without departing from the scope or spirit of the main characteristics of the present invention. All such modifications and changes that come within the meaning and range of equivalency of the claims are to be embraced within their scope.

The invention claimed is:

1. A fuel cell separator, comprising:
   a first plate;
   a second plate;
   a first manifold for first reactive gas supply formed on outer circumferences of the first plate and the second plate;
   a second manifold for first reactive gas exhaust formed on the outer circumferences;
   a third manifold for second reactive gas supply formed on the outer circumferences; and
   a fourth manifold for second reactive gas exhaust formed on the outer circumferences,
   wherein the first plate has a plurality of strip-shaped first projections protruded toward the second plate to define a plurality of first-reactive gas flow paths,
   the second plate has a plurality of strip-shaped second projections protruded toward the first plate to define a plurality of second reactive gas flow paths,
   a top of each of the plurality of the first projections is in contact with a bottom of a recess arranged between adjacent two of the plurality of the second projections formed on the second plate,
   a top of each of the plurality of the second projections is in contact with a bottom of a recess arranged between adjacent two of the plurality of the first projections formed on the first plate,
   the first reactive gas flow paths are alternately connected with the first manifold and the second manifold,
   the first reactive gas flow paths have closed ends that are opposite to respective connection ends alternately connecting with the first manifold and the second manifold,
   the second reactive gas flow paths are alternately connected with the third manifold and the fourth manifold,
   the second reactive gas flow paths have closed ends that are opposite to respective connection ends alternately connecting with the third manifold and the fourth manifold, and
   a cooling water flow path is formed between the first plate and second plate, and
   the first reactive gas flow paths, the cooling water flow paths and the second reactive gas flow paths are arranged alternately one by one to form a single line along a perpendicular direction against the stacking direction of the first plate and the second plate,
   wherein the first reactive gas flow paths are made of two types of reactive gas flow paths, one type is a first reactive gas flow supply path and the other is a first reactive gas flow exhaust path,
   wherein the second reactive gas flow paths are made of two types of second reactive gas flow paths, one type is a second reactive gas flow supply path and the other is a reactive gas flow exhaust path, and
   wherein the first reactive gas from the first reactive gas flow supply path to the first reactive gas flow exhaust path flows in a direction opposite to a direction in which the second reactive gas flows from the second reactive gas flow supply path to the second reactive gas flow exhaust path.

2. The fuel cell separator in accordance with claim 1, wherein one side face of each of the plurality of first projections is in contact with one side face of corresponding one of the plurality of the second projections.

3. The fuel cell separator in accordance with claim 1, further comprising:
   a third plate and a fourth plate arranged on an opposite side to the first plate and the second plate across a membrane electrode assembly,
   wherein the third plate has a plurality of strip-shaped third projections protruded toward the fourth plate to define a plurality of third reactive gas flow paths,
   the fourth plate has a plurality of strip-shaped fourth projections protruded toward the third plate to define a plurality of fourth reactive gas flow paths,
   a top of each of the plurality of the third projections is in contact with a bottom of a recess arranged between adjacent two of the plurality of the fourth projections formed on the fourth plate,
   a top of each of the plurality of the fourth projections is in contact with a bottom of a recess arranged between adjacent two of the plurality of the third projections formed on the third plate,
   the third reactive gas flow paths are alternately connected with the third manifold and the fourth manifold,
   the third reactive gas flow paths have closed ends that are opposite to respective connection ends alternately connecting with the third manifold and the fourth manifold,
   the fourth reactive gas flow paths are alternately connected with the first manifold and the second manifold,
   the fourth reactive gas flow paths have closed ends that are opposite to respective connection ends alternately connecting with the first manifold and the second manifold,
   the plurality of the third projections and the plurality of the second projections are arranged to face each other across the membrane electrode assembly, and
   the plurality of the fourth projections and the plurality of the first projections are arranged to face each other across the membrane electrode assembly.

4. A fuel cell, comprising:
   the fuel cell separator in accordance with claim 1; and
   a membrane electrode assembly.

5. The fuel cell separator in accordance with claim 2, further comprising:
   a third plate and a fourth plate arranged on an opposite side to the first plate and the second plate across a membrane electrode assembly,
   wherein the third plate has a plurality of strip-shaped third projections protruded toward the fourth plate to define a plurality of second third reactive gas flow paths,
   the fourth plate has a plurality of strip-shaped fourth projections protruded toward the third plate to define a plurality of fourth reactive gas flow paths,
   a top of each of the plurality of the third projections is in contact with a bottom of a recess arranged between adjacent two of the plurality of the fourth projections formed on the fourth plate, a top of each of the plurality of the fourth projections is in contact with a bottom of a recess arranged between adjacent two of the plurality of the third projections formed on the third plate, the third reactive gas flow paths are alternately connected with the third manifold and the fourth manifold, the third reactive gas flow paths have closed ends that are opposite to respective connection ends alternately connecting with the third manifold and the fourth manifold, the fourth reactive gas flow paths are alternately connected with the first manifold and the second manifold, the fourth reactive gas flow paths have closed ends that are opposite to respective connection ends alternately connecting with the first manifold and the second manifold, the plurality of the third projections and the plurality of the second projections are arranged to face each other across the membrane electrode assembly, the plurality of the fourth projections and the plurality of the first projections are arranged to face each other across the membrane electrode assembly, and a second cooling water flow path is formed between the third plate and fourth plate, and the third reactive gas flow paths, the second cooling water flow paths and the fourth reactive gas flow paths are arranged alternately one by one to form a single line along a perpendicular direction against the stacking direction of the third plate and the fourth plate.

6. A fuel cell, comprising:
the fuel cell separator in accordance with claim 2; and
a membrane electrode assembly.

7. A fuel cell, comprising:
the fuel cell separator in accordance with claim 3; and
a membrane electrode assembly.

8. A fuel cell, comprising:
the fuel cell separator in accordance with claim 5; and
a membrane electrode assembly.

* * * * *